US012316000B2

(12) United States Patent
Gakuhari et al.

(10) Patent No.: US 12,316,000 B2
(45) Date of Patent: May 27, 2025

(54) LOW-PROFILE ANTENNA DEVICE

(71) Applicant: HARADA INDUSTRY CO., LTD., Tokyo (JP)

(72) Inventors: Keiichi Gakuhari, Tokyo (JP); Kenta Noguchi, Tokyo (JP); Kenji Taira, Tokyo (JP); Tsutomu Yamamoto, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/705,989

(22) PCT Filed: Oct. 12, 2022

(86) PCT No.: PCT/JP2022/038041

§ 371 (c)(1),
(2) Date: Apr. 29, 2024

(87) PCT Pub. No.: WO2023/084983

PCT Pub. Date: May 19, 2023

(65) Prior Publication Data

US 2024/0332813 A1 Oct. 3, 2024

(30) Foreign Application Priority Data

Nov. 11, 2021 (JP) ................................. 2021-184278

(51) Int. Cl.
*H01Q 13/16* (2006.01)
*H01Q 1/32* (2006.01)
(Continued)

(52) U.S. Cl.
CPC ........... *H01Q 13/16* (2013.01); *H01Q 1/3275* (2013.01); *H01Q 1/42* (2013.01); *H01Q 5/50* (2015.01)

(58) Field of Classification Search
CPC .......... H01Q 1/3275; H01Q 1/32; H01Q 1/22; H01Q 1/42; H01Q 5/321; H01Q 5/50; H01Q 9/36; H01Q 13/16
See application file for complete search history.

(56) References Cited

U.S. PATENT DOCUMENTS 8,497,807 B2 * 7/2013 Wakui .................. H01Q 1/3275 343/711
2008/0117111 A1 * 5/2008 Ikeda ....................... H01Q 1/36 343/713
(Continued)

FOREIGN PATENT DOCUMENTS

EP 3629418 A1 4/2020
JP 2012204996 A 10/2012
(Continued)

OTHER PUBLICATIONS

International Search Report in PCT/JP2022/038041, dated Dec. 20, 2022.

*Primary Examiner* — Dameon E Levi
*Assistant Examiner* — Leah Rosenberg
(74) *Attorney, Agent, or Firm* — Global IP Counselors, LLP

(57) ABSTRACT

A low-profile antenna device includes a base plate, a top load element, and an antenna cover. The top load element has a ridge line part, a side surface part, and a slit. The ridge line part extends in the longitudinal direction of the top load element so as to be inclined with respect to the base plate. The slit extends from one side surface part to the middle of the other side surface part so as to pass through the ridge line part to divide the ridge line part into a front side part and a rear side part. The top load element is folded such that the ridge line part is changed in height at the slit so as to bring the ridge line part close to the topmost position inside the antenna cover.

9 Claims, 2 Drawing Sheets

(51) Int. Cl.
*H01Q 1/42* (2006.01)
*H01Q 5/50* (2015.01)

(56) References Cited

U.S. PATENT DOCUMENTS

| | | | | |
|---|---|---|---|---|
| 2012/0026050 | A1* | 2/2012 | Sampo | H01Q 21/28 343/749 |
| 2013/0176180 | A1* | 7/2013 | Wakui | H01Q 9/36 343/702 |
| 2014/0125549 | A1 | 5/2014 | Kaneko | |
| 2015/0200446 | A1* | 7/2015 | Kaneko | H01Q 1/27 343/702 |
| 2018/0212301 | A1* | 7/2018 | Iino | H01Q 21/30 |
| 2020/0099137 | A1* | 3/2020 | Miura | H01Q 23/00 |
| 2021/0044006 | A1 | 2/2021 | Shimizu et al. | |

FOREIGN PATENT DOCUMENTS

| | | | |
|---|---|---|---|
| WO | 2012001892 | A1 | 1/2012 |
| WO | 201915613 | A1 | 8/2019 |

* cited by examiner

LOW-PROFILE ANTENNA DEVICE

CROSS-REFERENCE TO RELATED APPLICATIONS

This application is a U.S. national stage application of International Application No. PCT/JP2022/038041, filed on Oct. 12, 2022. This application claims priority to Japanese Patent Application No. 2021-184278, filed on Nov. 11, 2021.

BACKGROUND

Technical Field

The present invention relates to a low-profile antenna device, and more particularly to a low-profile antenna device for vehicles.

Background Information

Various types of antenna devices are mounted on a vehicle these days. One example is an AM/FM radio antenna for receiving AM and FM broadcasts. The AM/FM radio antenna is typically a rod antenna. The rod antenna includes an element part in which an element (helical element) constituted by a helical conductor is covered with a cover member and a base plate for mounting the element part.

When the rod antenna is mounted onto a vehicle body, the element part significantly protrudes from the vehicle body. This may impair the beauty and design of the vehicle and cause breakage during garaging or car washing. Further, the rod antenna is exposed from the vehicle body, so that the element part has a possibility of being stolen.

To cope with such problems, there is proposed a low-profile antenna device designed so as to make the entire device height lower than the height of the rod antenna, to accommodate the element in an antenna case to prevent exposure thereof to the outside, and to form the antenna case into a FUKAHIRE shape (a shark fin shape) considering the design property of the entire vehicle mounted with the antenna device. Such a low-profile antenna device often has a height of 70 mm or less and a length in the longitudinal direction of about 200 mm in consideration of regulations.

However, the low-profile antenna device having a height as low as 70 mm or less may degrade radiation efficiency due to antenna conductor loss (reduction in element length), which may cause sensitivity degradation. For example, to solve this problem, Japanese Patent Application Publication No. 2012-204996 (Patent Document 1) discloses a low-profile antenna device in which a coil is inserted between a top load element and an amplifier circuit.

Further, as in the re-publication of PCT International Publication No. 2019/156138 (Patent Document 2), there is known a vehicle antenna device having an antenna and a camera in which, to increase antenna gain, a capacity loaded element has a smaller length in the height direction at a part thereof overlapping the camera in a top view and/or a side view than at a part thereof not overlapping the camera.

SUMMARY

In the low-profile antenna device, an antenna element is preferably disposed at a position as high as possible inside an antenna cover so as to prevent degradation in antenna reception characteristics. The antenna cover defines the outer shape of the antenna device and has a streamlined shape with an arc top part. Thus, the top part of a top load element is formed into an arc shape so as to follow the inner side shape of the arc-shaped antenna cover top part. For example, in Patent Document 1, a top load element is folded such that the angle of the top part thereof with respect to a base plate changes on the way. In Patent Document 2, a top load element is formed into a meander shape and made to follow the topmost position inside an antenna cover.

Further, another example is a top load element, which is obtained by drawing, e.g., a metal plate, configured to be completely fit to the inner shape of the antenna cover.

However, the above-mentioned top load elements have a complicated shape and are high in manufacturing cost. Further, because of the complicated shape, manufacturing error in the top load element directly affects antenna reception characteristics, so that it is necessary to provide a correction circuit for correcting the error and to adjust the error in the top load elements of the individual low-profile antenna devices.

It has therefore been desired to develop a low-profile antenna device having no problem in antenna reception characteristics, being easy to manufacture and suppressing cost, and having reduced manufacturing error.

The present invention has been made in view of the above situation, and an object thereof is to provide a low-profile antenna device having no problem in antenna reception characteristics, being easy to manufacture and suppressing cost, and having reduced manufacturing error.

To achieve the above object of the present invention, a low-profile antenna device according to the present invention includes: a base plate fixed to a vehicle; a top load element disposed spaced apart from the base plate in a height direction and configured to function as an antenna for a first frequency band; and an antenna cover fitted to the base plate and housing thereinside the top load element, wherein the top load element includes: a ridge line part extending in a longitudinal direction of the top load element so as to be inclined with respect to the base plate; a side surface part extending from both sides of the ridge line part; and a slit extending from the side surface part on one side to a middle of the side surface part on the other side so as to pass through the ridge line part to divide the ridge line part into a front side part and a rear side part, the slit facing a direction perpendicular to the ridge line part. The top load element is folded such that the ridge line part is changed in height between front and rear sides of the slit so as to bring the ridge line part close to a topmost position inside the antenna cover.

The top load element may be in a flat plate state before being folded, and in the flat plate state, the ridge line part is designed such that the ridge line part on the rear side of the slit is offset with respect to the ridge line part on the front side of the slit in a slit depth direction.

The side surface part of the top load element may be extended in the longitudinal direction of the top load element beyond the ridge line part.

The side surface part of the top load element may have a constant distance in a height direction to the base plate.

The slit may include a plurality of slits, and the top load element may be folded such that the ridge line part is changed in height between front and rear sides of each of the plurality of slits so as to bring the ridge line part close to the topmost position inside the antenna cover.

The top load element may further include: a pair of wiring slits formed in the side surface part so as to face in a direction perpendicular to the ridge line part; and a plate-shaped wiring provided by being cut, along the wiring slits, from the top load element.

The low-profile antenna may further include: a circuit board disposed on the base plate and having a feeding terminal; and a coil connected between the top load element and the feeding terminal and adjusted to function as a resonance antenna for a second frequency band by a series circuit of the top load element and the coil.

The coil may be disposed such that the axial direction thereof is parallel to the base plate and the longitudinal direction of the top load element.

The coil may be disposed below the ridge line part at the front side of the slit.

The low-profile antenna device according to the present invention has advantages of having no problem in antenna reception characteristics, being easy to manufacture and suppressing cost, and having reduced manufacturing error.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1:
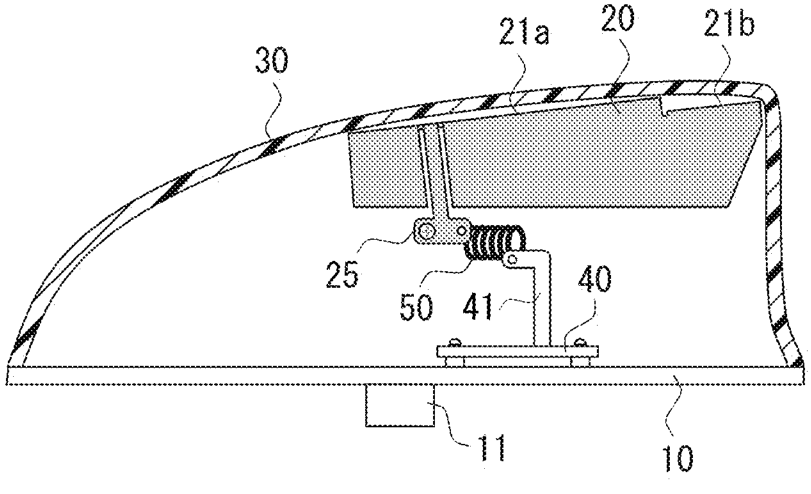
FIG. 1 is a schematic side view for explaining a low-profile antenna device according to an illustrated embodiment.

Hereinafter, an embodiment for practicing the present invention will be described with illustrated examples. FIG. 1 is a schematic side view for explaining a low-profile antenna device according to the present invention. A part therein is a cross sectional view for explaining the inside of the low-profile antenna device. As illustrated, the low-profile antenna device according to the present invention includes a base plate 10, a top load element 20, and an antenna cover 30.

The base plate 10 is fixed to a vehicle. Specifically, the base plate 10 may be a so-called resin base formed of an insulator such as resin, or may be a so-called metal base formed of a conductor such as metal. Also, the base plate 10 may be a composite base of resin and metal. For example, a screw boss 11 is provided on the base plate 10. The screw boss 11 is inserted into a hole formed in a roof or the like of the vehicle, and a nut is fastened from a vehicle cabin side to fix the base plate 10 to the roof or the like so as to sandwich the roof or the like between the nut and the base plate 10. A power supply cable or a signal cable for connecting the vehicle interior and the antenna device is inserted through the screw boss 11. Further, the base plate 10 is configured to be covered with the antenna cover 30, the detail of which will be described later.

The top load element 20 functions as an antenna for a first frequency band. For example, the top load element 20 may be a so-called capacity loaded antenna element. Specifically, the first frequency band may be an AM frequency band. In the AM frequency band, the top load element 20 functions as a capacitive antenna. The top load element 20 may have an element length corresponding to the first frequency band. In this case, the first frequency band may be, e.g., a DTV frequency band. In the DTV frequency band, the top load element 20 functions as a resonance antenna. The top load element 20 is disposed spaced apart from the base plate 10 in the height direction. In the example illustrated in FIG. 1, the left side is a vehicle traveling direction, and the longitudinal direction of the top load element 20 faces the vehicle traveling direction.

The antenna cover 30 is fitted to the base plate 10 so as to house thereinside the top load element 20. In the illustrated example, the antenna cover 30 defines the outer shape of the low-profile antenna device; however, the low-profile antenna device according to the present invention is not limited to this. For example, the antenna cover 30 may have an inner cover and an outer cover. That is, this may be a double cover structure. In this case, the inner cover houses thereinside the top load element 20, and the outer cover defines the outer shape.

As described concerning the problems to be solved by the conventional low-profile antenna devices, the antenna cover 30 defining the outer shape of the low-profile antenna device has a streamlined shape with an arc top part. Specifically, as illustrated, the height of the antenna cover 30 is lowest at the leading end side in the vehicle traveling direction, gradually increases rearward, and decreases from the topmost point toward the rear end. The top load element 20 is preferably disposed at the topmost position inside the antenna cover 30 so as to degrade antenna characteristics as little as possible. Meanwhile, to reduce variations in antenna reception characteristics, the top load element 20 needs to have reduced manufacturing error. To this end, in the low-profile antenna device according to the present invention, the top load element 20 is configured as described below.

Figure 2:
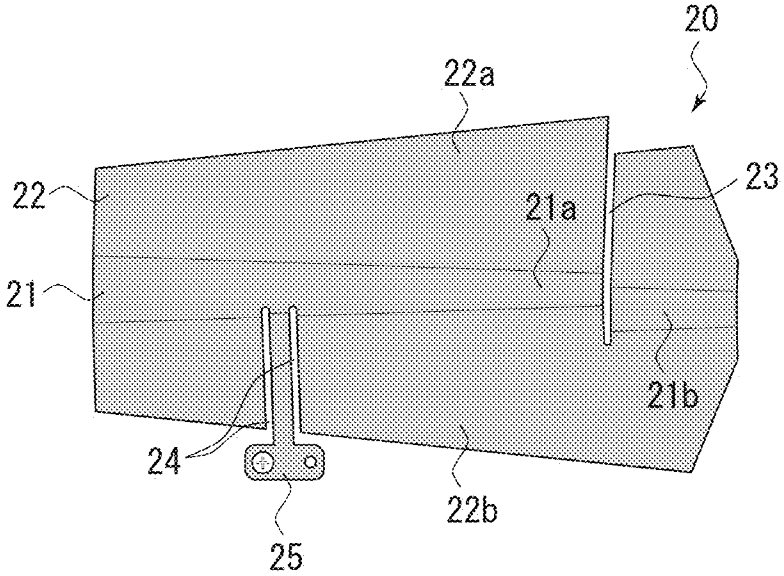
FIG. 2 is a developed view illustrating an unfolded state of a top load element constituting the low-profile antenna device according to the illustrated embodiment.

FIG. 2 is a developed view illustrating an unfolded state of the top load element constituting the low-profile antenna device according to the present invention. In the drawings, the same reference numerals as those in FIG. 1 denote the same parts. As illustrated, the top load element 20 has a ridge line part 21, a side surface part 22, and a slit 23. The top load element 20 is in a flat plate state before being folded. Then, a predetermined shape as illustrated is cut out from the flat plate, followed by folding at a predetermined position, whereby the top load element 20 is formed.

The ridge line part 21 extends in the longitudinal direction of the top load element 20. After the folding, the ridge line part 21 is inclined with respect to the base plate 10 as illustrated in FIG. 1. Specifically, as illustrated in FIG. 1, the ridge line part 21 is inclined so as to rise rearward in the vehicle traveling direction. The ridge line part 21 illustrated in FIG. 2 does not have a linear shape but has a certain width which increases in the vehicle traveling direction. However, the present invention is not limited to this, but the width of the ridge line part 21 may be appropriately determined in accordance with the inner shape of the antenna cover 30.

The side surface part 22 extends from both sides of the ridge line part 21. In the illustrated example, the right side in the vehicle traveling direction is referred to as a side surface part 22*a*, and the left side is referred to as a side surface part 22*b*. The ridge line part 21 and the side surface parts 22*a* and 22*b* obliquely extending from both sides of the ridge line part 21 form a mountain-like shape in the cross section of the top load element 20.

The slit 23, which is the most characteristic part of the low-profile antenna device according to the present invention, is formed as follows. That is, as illustrated in FIG. 2, the slit 23 extends from the side surface part 22*a* to the middle of the side surface part 22*b* through the ridge line part 21. The slit 23 faces a direction perpendicular to the ridge line part 21. In other words, the slit 23 is provided cross the folding lines of the ridge line part 21 at right angles. The slit 23 placed to pass through the ridge line part 21 divides the ridge line part 21 into front and rear sections. In the illustrated example, the front side is referred to as a ridge line part 21*a*, and the rear side is as a ridge line part 21*b*.

In a flat plate state illustrated in FIG. 2, the ridge line part 21 is designed such that the rear side ridge line part 21*b* is offset with respect to the front side ridge line part 21*a* in the depth direction of the slit 23. That is, the ridge line parts 21*a* and 21*b* divided by the slit 23 are not arranged in a straight line in the vehicle traveling direction in a flat plate state before being folded, and the ridge line part 21*b* is offset to the left side (lower side in the drawing) of the vehicle traveling direction.

Figure 3:
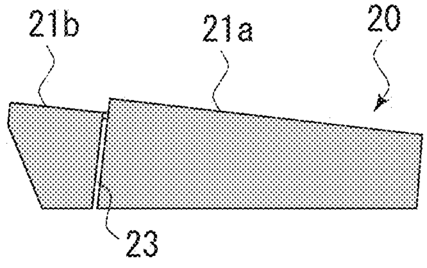
FIG. 3 is a schematic side view for explaining the opposite side surface of the top load element constituting the low-profile antenna device according to the illustrated embodiment.

The top load element 20 as illustrated in FIG. 1 is formed by folding such a flat plate. The opposite side surface of the top load element 20 is as illustrated in FIG. 3. FIG. 3 is a schematic side view for explaining the opposite side surface of the top load element constituting the low-profile antenna device according to the present invention. In the drawings, the same reference numerals as those in FIG. 1 denote the same parts. In this example, only the top load element 20 is illustrated, and other components are omitted.

After folding the flat plate described above, the ridge line part 21 is changed in height between front and rear sides of the slit 23 as illustrated in FIGS. 1 and 3. This allows the rear end portion of the ridge line part 21*a* to be brought close to the topmost position inside the antenna cover 30. As illustrated, the ridge line part 21 is made close to the topmost position inside the antenna cover 30 at three portions: the front end portion of the top load element 20; a portion where the slit 23 is formed; and the rear end portion of the top load element 20. Thus, the ridge line part 21 can be brought closer to the topmost position inside the antenna cover 30. The folding mentioned here refers to "to simply linearly folding the flat plate", which means that a complicated process such as drawing to form a curved surface or folding into a curved surface is not necessary.

Further, in a flat plate state, the top load element 20 has a tapered shape in the vehicle traveling direction as illustrated in FIG. 2. Specifically, the width of the side surface part 22 is reduced in the vehicle traveling direction. The reason for this is to make the side surface part 22 have a constant distance in a height direction to the base plate 10 after the folding. That is, since the ridge line part 21 is inclined with respect to the base plate 10, the side surface part 22 is designed such that the width thereof increases rearward in the vehicle traveling direction as the height of the ridge line part 21 increases rearward in the vehicle traveling direction so as to make the distance between the side surface part 22 and the base plate 10 constant. This reduces capacitive coupling between the top load element 20 and the base plate 10 while increasing the antenna capacity of the top load element 20 as much as possible, thereby suppressing degradation in antenna reception characteristics.

Figure 4:
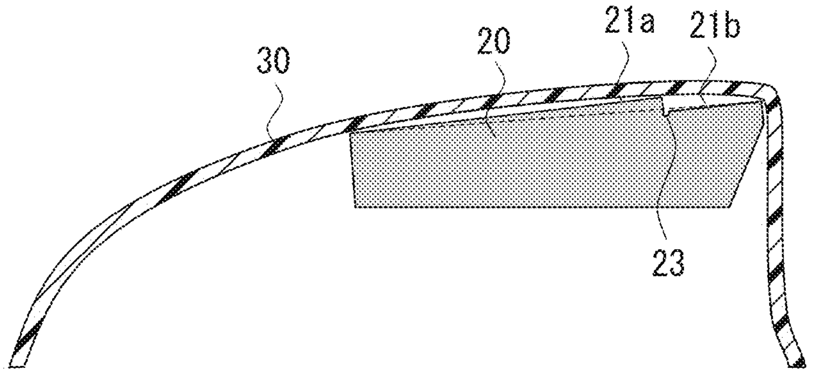
FIG. 4 is a schematic side view for comparing the top load element of the low-profile antenna device according to the present invention and a conventional top load element.

Next, more specific description will be given, using FIG. 4, of how much closer the ridge line part 21 of the top load element 20 constituting the low-profile antenna device according to the present invention is to the topmost position inside the antenna cover 30. FIG. 4 is a schematic side view for comparing the top load element of the low-profile antenna device according to the present invention and a conventional top load element. In the drawings, the same reference numerals as those in FIG. 1 denote the same parts. The top load element 20 of the low-profile antenna device according to the present invention is denoted by the solid line, and the conventional top load element is denoted by the dashed line. The conventional top load element is formed by simply folding a flat plate without any modification. In this example, only the top load element 20 and the antenna cover 30 are illustrated, and other components are omitted.

As illustrated, the conventional top load element is formed such that the ridge line part is simply linearly folded with no modification applied to the top load element, the resultant ridge line part extends straight from the front side to the rear side in the vehicle traveling direction. Thus, only the front and rear end portions of the top load element are brought close to the topmost position inside the antenna cover 30, whereas the center portion is significantly separated from the topmost position.

On the other hand, in the top load element 20 of the low-profile antenna device according to the present invention, the ridge line part 21 differs in height between the front and rear sides of the slit 23. Specifically, the rear end portion of the ridge line part 21*a* is brought close to the topmost position inside the antenna cover 30.

As described above, in the low-profile antenna device according to the present invention, it is possible to bring the ridge line part close to the topmost position inside the antenna cover simply by linearly folding the top load 20. Thus, antenna reception characteristics are free from problems. Further, neither a complicated design nor complicated work such as drawing is required, thereby facilitating manufacturing, leading to reduction in manufacturing cost. In addition, manufacturing error is reduced due to the simple linear folding. As a result, antenna reception characteristics have reduced variations.

Referring again to FIG. 1, the low-profile antenna device according to the present invention has a circuit board 40 and a coil 50. Thus, the low-profile antenna device according to the present invention can be designed as a composite antenna. The circuit board 40 is disposed on the base plate 10 and has a feeding terminal 41. The circuit board 40 has thereon an amplifier circuit and/or a filter circuit as needed and is configured to receive signals. The coil 50 is connected between the top load element 20 and the feeding terminal 41. By a series circuit of the top load element 20 and coil 50, the function of a resonance antenna for a second frequency band is achieved. The second frequency band may be an FM frequency band. For example, the inductor of the coil 50 is appropriately selected so as to allow the series circuit of the top load element 20 and coil 50 to function as a resonance antenna in the FM frequency band.

As illustrated, the coil 50 is disposed such that the axial direction thereof is parallel to the base plate 10 and the longitudinal direction of the top load element 20. The coil 50 is thus disposed laterally, so that even when the length (number of turns) of the coil 50 differs depending on vehicle type, only the lateral length is changed, but the distance from the circuit board 40 is not changed. Thus, adjusting the length of the coil 50 has little influence on antenna reception characteristics.

The coil 50 is preferably disposed below the ridge line part 21*a* at the front side of the silt 23 rather than below the ridge line part 21*b* at the rear side of the slit 23. The coil 50 need not necessarily be disposed immediately below the ridge line part 21 but may be shifted left or right in the vehicle traveling direction. Further, the coil 50 may be disposed such that the axial direction thereof is perpendicular to the longitudinal direction of the top load element 20.

Further, a wiring for connecting the top load element 20 and coil 50 may be formed by cutting the top load element 20. Specifically, the top load element 20 has a pair of wiring slits 24 and a plate-shaped wiring 25. As illustrated in FIG. 2, the pair of wiring slits 24 are formed in the side surface part 22. The pair of wiring slits 24 faces in a direction perpendicular to the ridge line part 21. The plate-shaped wiring 25 is provided by being cut, along the wiring slits 24, from the top load element 20. The plate-shaped wiring 25 is connected to the coil 50. As described above, the wiring connected to the coil 50 can be provided by cutting the top load element 20, so that it is not necessary to newly prepare a wire or the like, thereby reducing manufacturing error. In the illustrated example, the plate-shaped wiring 25 is provided for the case where the coil is used; however, the present invention is not limited to this, but the plate-shaped wiring 25 may be used even when the top load element 20 is directly connected to the feeding terminal 41 without the coil 50.

Figure 5:
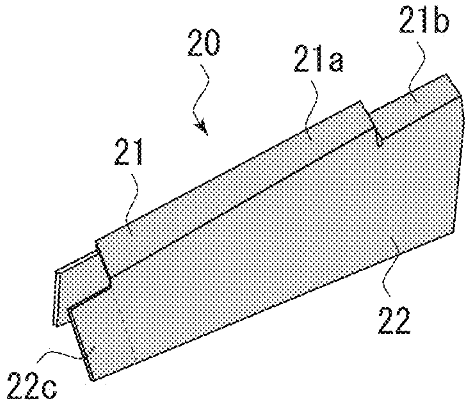
FIG. 5 is a schematic perspective view for explaining a modification of the top load element constituting the low-profile antenna element according to another illustrated embodiment.

Next, a modification of the top load element constituting the low-profile antenna element according to the present invention will be described using FIG. 5. FIG. 5 is a schematic perspective view for explaining the modification of the top load element constituting the low-profile antenna element according to the present invention. In the drawings, the same reference numerals as those in FIG. 1 denote the same parts. In this example, only the top load element 20 is illustrated, and other components are omitted. As in this example, the side surface part 22 of the top load element 20 is extended in the longitudinal direction of the top load element 20 beyond the ridge line part 21. Specifically, the leading end portion 22*c* of the side surface part 22 is extended to the front side in the vehicle traveling direction beyond the front side end portion of the ridge line part 21. With this configuration, the leading end portion 22*c* of the side surface part 22 can be provided at which the ridge line part 21 cannot be contained in the low height portion of the front side end of the antenna cover 30. That is, a space on the leading end side of the antenna cover 30 having a low height can be effectively used, allowing further increase in the antenna capacity of the top load element 20. In the illustrated example, the side surface part 22 is extended to the front side in the vehicle traveling direction beyond the ridge line part 21; however, the present invention is not limited to this, but the side surface part 22 may be extended to the rear side in the vehicle traveling direction beyond the ridge line part 21.

Figure 6:
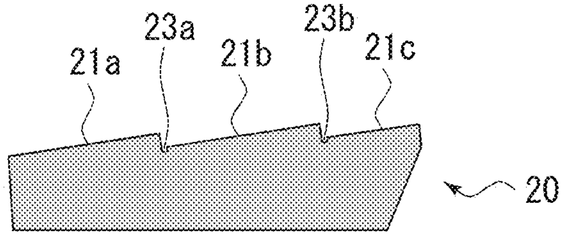
FIG. 6 is a schematic side view for explaining another modification of the top load element constituting the low-profile antenna element according to another illustrated embodiment.

In the above-described examples, the number of slits 23 is one, and the number of portions where the height of the ridge line part 21 changes is one; however, the present invention is not limited to this. The following describes, using FIG. 6, an example in which the height changes at a plurality of portions. FIG. 6 is a schematic side view for explaining another modification of the top load element constituting the low-profile antenna element according to the present invention. In the drawings, the same reference numerals as those in FIG. 1 denote the same parts. In this example, only the top load element 20 is illustrated, and other components are omitted. As illustrated, the top load element 20 has a plurality of slits 23*a* and 23*b*. Although two slits are formed in this example, the present invention is not limited to this, but a greater number of slits may be formed.

As illustrated, the top load element 20 is folded such that the ridge line parts 21*a*, 21*b*, and 21*c* are changed in height between front and rear sides of each of the plurality of slits 23*a* and 23*b* so as to bring the ridge line part 21 close to the topmost position inside the antenna cover 30. That is, the top load element 20 of this example has a saw-tooth roof shape as viewed from the side. By thus finely changing the height of the ridge line part 21, it is possible to bring the ridge line part 21 close to the topmost position in accordance with the inner shape of the antenna cover 30 at shorter interval.

The low-profile antenna element according to the present invention is not limited to the above illustrated examples but may be variously modified without departing from the scope of the present invention.

The invention claimed is:

1. A low-profile antenna device for a vehicle, the low-profile antenna device comprising:
- a base plate fixed to the vehicle;
- a top load element disposed and spaced apart from the base plate in a height direction and configured to function as an antenna for a first frequency band; and
- an antenna cover fitted to the base plate and housing the top load element, wherein
- the top load element includes:
  - a ridge line part extending in a longitudinal direction of the top load element so as to be inclined with respect to the base plate;
  - a side surface part having a first side surface and a second side surface, each extending from both sides of the ridge line part; and
  - a slit extending from an edge of the first side surface to a part of the second side surface so as to pass through the ridge line part to divide the ridge line part and the first side surface into a front side part and a rear side part, the slit facing a direction perpendicular to the ridge line part,
- the top load element is folded such that the ridge line part is changed in height with a step between front and rear sides of the slit so as to bring the ridge line part close to a topmost position inside the antenna cover,
- the front side part of the ridge line part has a first front end and a first rear end in the longitudinal direction, the first front end is closer to the base plate than the first rear end in the height direction, and the first rear end is closer to the slit than the first front end in the longitudinal direction,
- the rear side part of the ridge line part has a second front end and a second rear end in the longitudinal direction, the second front end is closer to the base plate than the second rear end in the height direction, and the second front end is closer to the slit than the second rear end in the longitudinal direction,
- the first rear end and the second front end define a part of the slit, and
- the second front end is closer to the base plate than the first rear end in the height direction.

2. The low-profile antenna device according to claim 1, wherein
- the top load element is in a flat plate state before being folded, and in the flat plate state, the ridge line part is designed such that the ridge line part on the rear side of the slit is offset with respect to the ridge line part on the front side of the slit in a slit depth direction.

3. The low-profile antenna device according to claim 1, wherein the side surface part of the top load element is extended in the longitudinal direction of the top load element beyond the ridge line part.

4. The low-profile antenna device according to claim 1, wherein the side surface part of the top load element has a constant distance in a height direction to the base plate.

5. The low-profile antenna device according to claim 1, wherein the slit includes a plurality of slits, and the top load element is folded such that the ridge line part is changed in height between front and rear sides of each of the plurality of slits so as to bring the ridge line part close to the topmost position inside the antenna cover.

6. The low-profile antenna device according to claim 1, wherein the top load element further includes:

a pair of wiring slits formed in the side surface part so as to face in a direction perpendicular to the ridge line part; and a plate-shaped wiring provided by being cut, along the wiring slits, from the top load element.

7. The low-profile antenna device according to claim 1, further comprising a circuit board disposed on the base plate and having a feeding terminal; and a coil connected between the top load element and the feeding terminal and adjusted to function as a resonance antenna for a second frequency band by a series circuit of the top load element and the coil.

8. The low-profile antenna device according to claim 7, wherein the coil is disposed such that the axial direction thereof is parallel to the base plate and the longitudinal direction of the top load element.

9. The low-profile antenna device according to claim 7, wherein the coil is disposed below the ridge line part at the front side of the slit.

* * * * *